(12) United States Patent
Shooks et al.

(10) Patent No.: US 11,572,018 B2
(45) Date of Patent: Feb. 7, 2023

(54) VEHICULAR EXTERIOR MIRROR ASSEMBLY WITH BLIND ZONE INDICATOR INCLUDING ANTI-BACKOUT CONNECTOR

(71) Applicant: Magna Mirrors of America, Inc., Holland, MI (US)

(72) Inventors: Jeremy R. Shooks, Plainwell, MI (US); Neil A. Bergsma, Grand Rapids, MI (US); Matthew S. VanOeveren, Hudsonville, MI (US); Michael J. Galdys, Wyoming, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 236 days.

(21) Appl. No.: 17/247,625

(22) Filed: Dec. 18, 2020

(65) Prior Publication Data

US 2021/0197726 A1     Jul. 1, 2021

Related U.S. Application Data

(60) Provisional application No. 62/954,054, filed on Dec. 27, 2019.

(51) Int. Cl.
*B60R 1/12*     (2006.01)
*B60R 21/017*     (2006.01)
(Continued)

(52) U.S. Cl.
CPC ............... *B60R 1/12* (2013.01); *B60R 16/03* (2013.01); *H01R 13/4223* (2013.01); *B60R 1/06* (2013.01);
(Continued)

(58) Field of Classification Search
CPC .. B60R 1/12; B60R 16/03; B60R 1/06; B60R 2001/1215; H01R 13/4223; H01R 2201/26; H01R 13/639
See application file for complete search history.

(56) References Cited

U.S. PATENT DOCUMENTS 2,263,382 A     11/1941     Gotzinger
2,580,014 A     12/1951     Gazda
(Continued)

*Primary Examiner* — Sath V Perungavoor
*Assistant Examiner* — Tyler B Edwards
(74) *Attorney, Agent, or Firm* — Honigman LLP

(57) ABSTRACT

A vehicular exterior rearview mirror assembly includes a mirror head disposed at a mounting structure and having a mirror casing and a mirror reflective element. An indicator module is disposed at a rear portion of the mirror reflective element and includes a housing having an indicating portion and a connector portion, a circuit board disposed in the indicating portion and having circuitry and a light source. The circuitry includes electrically conductive terminals extending from the circuit board and disposed at the connector portion of the housing. An electrical connector has a connecting end that is received in the connector portion of the housing to electrically connect to the electrically conductive terminals. An anti-backout element is disposed at the connector portion. With the electrical connector received in the connector portion, the anti-backout element is positioned at the electrical connector to preclude backing out of the electrical connector from the connector portion.

31 Claims, 8 Drawing Sheets

(51) Int. Cl.
  *H01R 13/422*  (2006.01)
  *B60R 16/03*  (2006.01)
  *B60R 1/06*  (2006.01)

(52) U.S. Cl.
  CPC .. *B60R 2001/1215* (2013.01); *H01R 2201/26* (2013.01)

(56) References Cited

U.S. PATENT DOCUMENTS

| | | |
|---|---|---|
| 3,266,016 A | 8/1966 | Maru |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |
| 4,906,085 A | 3/1990 | Sugihara et al. |
| 5,313,335 A | 5/1994 | Gray et al. |
| 5,355,284 A | 10/1994 | Roberts |
| 5,371,659 A | 12/1994 | Pastrick et al. |
| 5,436,741 A | 7/1995 | Crandall |
| 5,481,409 A | 1/1996 | Roberts |
| 5,497,306 A | 3/1996 | Pastrick |
| 5,575,552 A | 11/1996 | Faloon et al. |
| 5,587,699 A | 12/1996 | Faloon et al. |
| 5,668,663 A | 9/1997 | Varaprasad et al. |
| 5,669,699 A | 9/1997 | Pastrick et al. |
| 5,786,772 A | 7/1998 | Schofield et al. |
| 5,788,357 A | 8/1998 | Muth et al. |
| 5,823,654 A | 10/1998 | Pastrick et al. |
| 5,900,999 A | 5/1999 | Huizenga et al. |
| 5,929,786 A | 7/1999 | Schofield et al. |
| 5,938,320 A | 8/1999 | Crandall |
| 5,986,364 A | 11/1999 | Bingle et al. |
| 6,005,724 A | 12/1999 | Todd |
| 6,045,243 A | 4/2000 | Muth et al. |
| 6,111,683 A | 8/2000 | Cammenga et al. |
| 6,176,602 B1 | 1/2001 | Pastrick et al. |
| 6,198,409 B1 | 3/2001 | Schofield et al. |
| 6,213,612 B1 | 4/2001 | Schnell et al. |
| 6,227,689 B1 | 5/2001 | Miller |
| 6,229,226 B1 | 5/2001 | Kramer et al. |
| 6,243,218 B1 | 6/2001 | Whitehead |
| 6,257,746 B1 | 7/2001 | Todd et al. |
| 6,264,353 B1 | 7/2001 | Caraher et al. |
| 6,276,821 B1 | 8/2001 | Pastrick et al. |
| 6,356,376 B1 | 3/2002 | Tonar et al. |
| 6,362,548 B1 | 3/2002 | Bingle et al. |
| 6,467,920 B2 | 10/2002 | Schnell et al. |
| 6,512,624 B2 | 1/2003 | Tonar et al. |
| 6,582,109 B2 | 6/2003 | Miller |
| 6,685,864 B2 | 2/2004 | Bingle et al. |
| 6,690,268 B2 | 2/2004 | Schofield et al. |
| 6,700,692 B2 | 3/2004 | Tonar et al. |
| 6,755,544 B2 | 6/2004 | Schnell et al. |
| 6,882,287 B2 | 4/2005 | Schofield |
| 6,902,284 B2 | 6/2005 | Hutzel et al. |
| 6,916,100 B2 | 7/2005 | Pavao |
| 7,038,577 B2 | 5/2006 | Pawlicki et al. |
| 7,073,914 B2 | 7/2006 | Pavao |
| 7,080,914 B1 | 7/2006 | Boddy |
| 7,195,381 B2 | 3/2007 | Lynam et al. |
| 7,400,435 B2 | 7/2008 | Byers et al. |
| 7,492,281 B2 | 2/2009 | Lynam et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,881,496 B2 | 2/2011 | Camilleri et al. |
| 7,944,371 B2 | 5/2011 | Foote et al. |
| 8,058,977 B2 | 11/2011 | Lynam |
| 8,786,704 B2 | 7/2014 | Foote et al. |
| 9,616,808 B2 | 4/2017 | De Wind et al. |
| 9,659,498 B2 | 5/2017 | Kendall et al. |
| 10,589,716 B2 | 3/2020 | Sobecki et al. |
| 10,744,930 B2 | 8/2020 | Sobecki et al. |
| 2007/0184284 A1* | 8/2007 | Varaprasad ............ B32B 17/06 428/522 |
| 2016/0078768 A1 | 3/2016 | Huizen et al. |

* cited by examiner

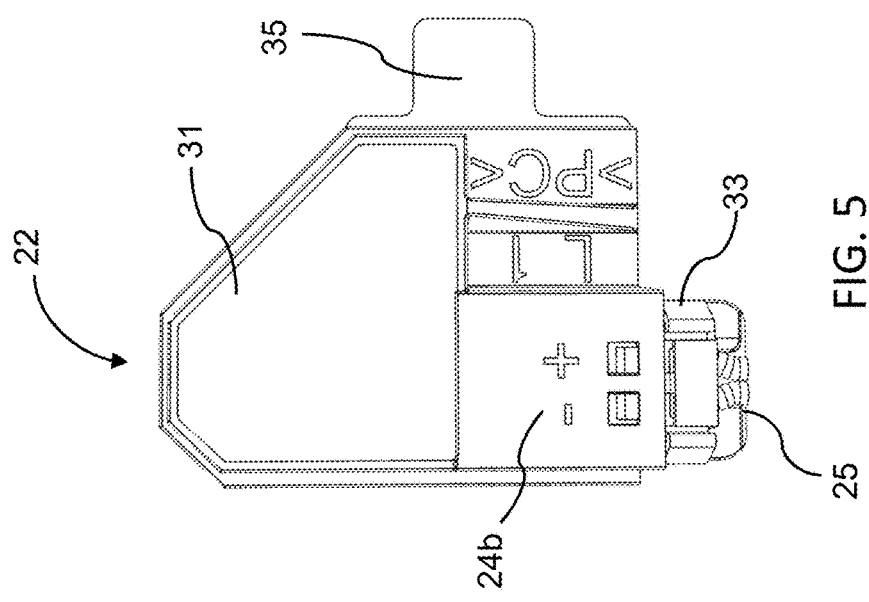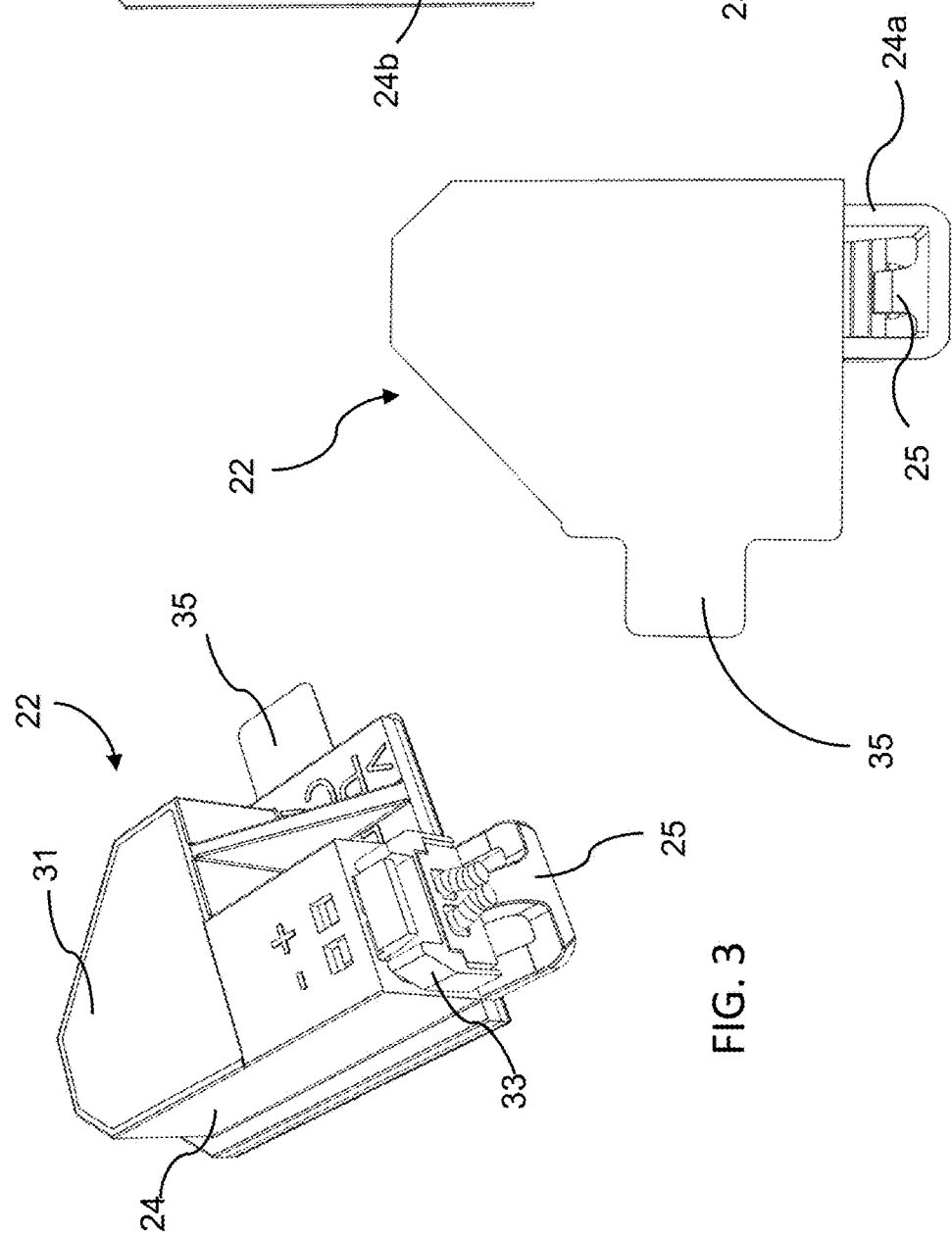

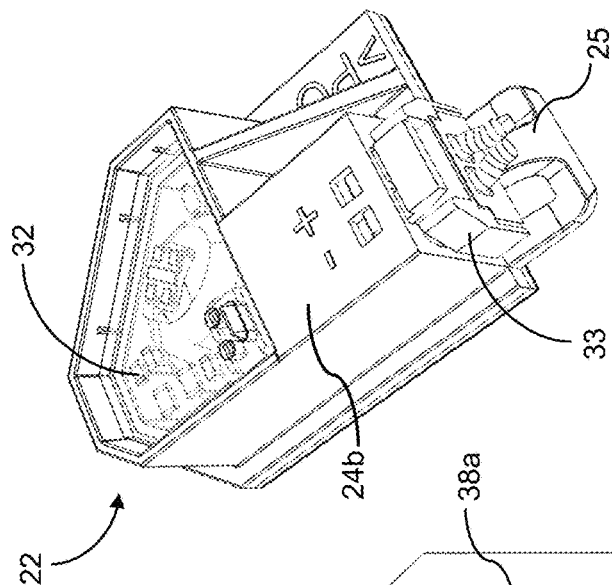
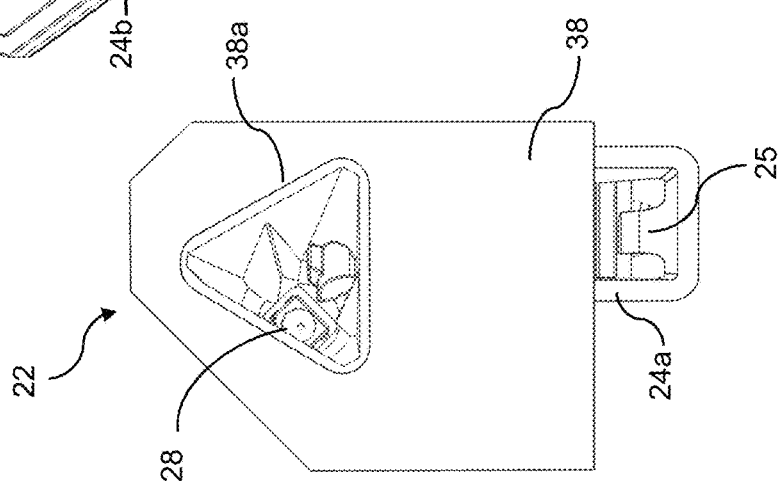
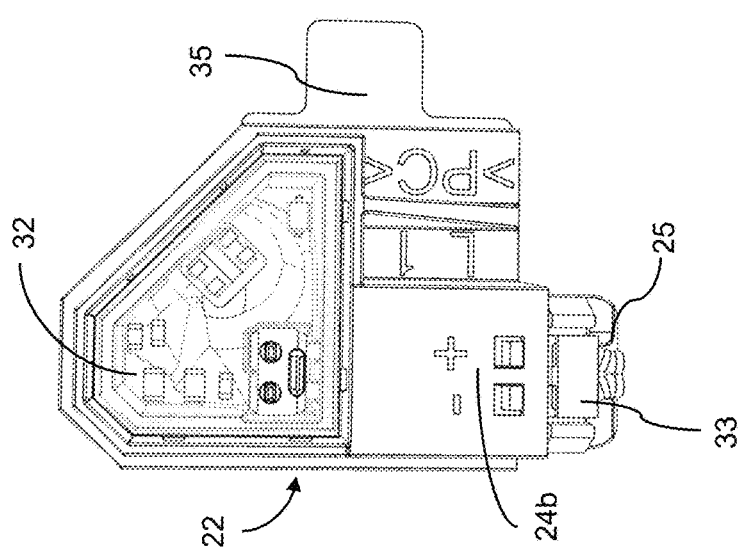
FIG. 6
FIG. 7
FIG. 8

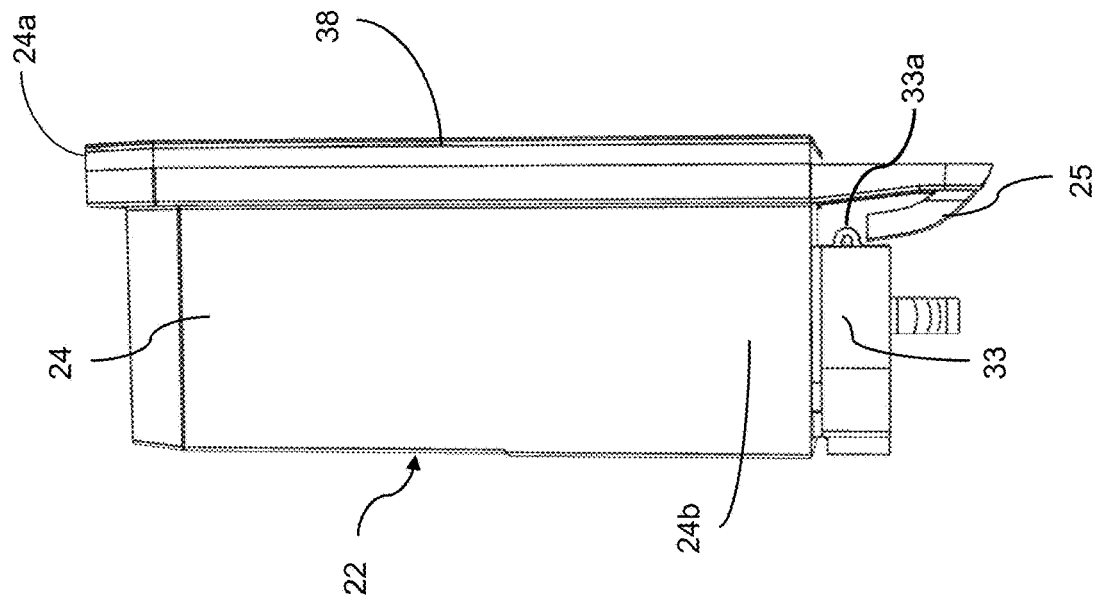
FIG. 10
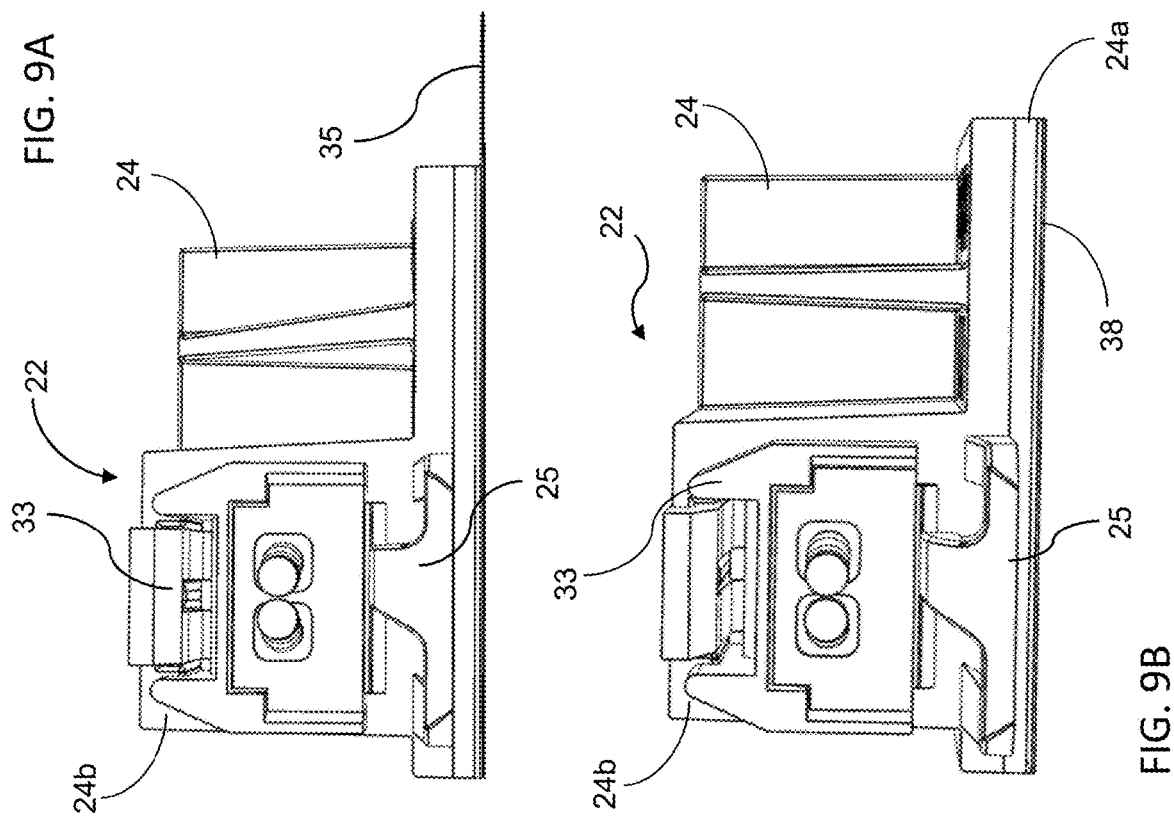
FIG. 9A
FIG. 9B

VEHICULAR EXTERIOR MIRROR ASSEMBLY WITH BLIND ZONE INDICATOR INCLUDING ANTI-BACKOUT CONNECTOR

CROSS REFERENCE TO RELATED APPLICATION

The present application claims the filing benefits of U.S. provisional application Ser. No. 62/954,054, filed Dec. 27, 2019, which is hereby incorporated herein by reference in its entirety.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or logo lamp or icon illuminator or indicator or other indicator or light emitting device at the exterior rearview mirror assembly.

BACKGROUND OF THE INVENTION

It is known to provide a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such a blind spot detection/LCA system often includes a visual indicator that visually indicates the detection of another vehicle or object to the driver of the host vehicle. It is also know to provide a turn signal indicator that is activated when a turn signal is activated by the driver of the equipped vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

A variety of interior and exterior mirror assemblies with indicators are known in the art, such as described in U.S. Pat. Nos. 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, and International Publication WO 95/30495, which are all hereby incorporated herein by reference in their entireties.

SUMMARY OF THE INVENTION

The present invention provides a vehicular exterior rearview mirror assembly configured for mounting at a side of a vehicle and having a blind zone or blind spot indicator or lane change assist (LCA) indicator or turn signal indicator or logo lamp or icon illuminator or indicator or other indicator or light emitting device that is disposed at the mirror reflector carrier or back plate of the mirror reflector sub-assembly so as to be positioned at and attached to the mirror reflective element when the back plate is adhered or otherwise attached at the back of the mirror reflective element. Preferably, the signal indicator is provided as a sealed or substantially sealed unit or module that can be snapped into or otherwise attached or secured (preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater pad or other item or element) is joined to the mirror back plate.

The blind zone indicator of the present invention includes a housing with an inner surface or structure that is angled so that light emitted by one or more light sources (such as light emitting diodes) at the back or rear portion of the diffuser and housing is directed generally towards the side of the vehicle for viewing by the driver of the vehicle. The housing and module is attached at the rear of the reflective element (such as at a heater pad adhered at the rear surface of the reflective element or at the rear surface of the reflective element itself or at a rear surface of the mirror back plate) via an adhesive tape or foam tape element that may conform to the reflective element (such as to a curvature of the reflective element) while attaching the module at the rear of the reflective element. The module includes a circuit board, which is arranged generally parallel to the reflective element when the module is attached at the rear of the reflective element. The circuit board has electrical connectors or terminals that are disposed at a connector portion of the housing for electrical connection to a wire lead or harness of the mirror assembly or vehicle. The blind zone indicator includes an anti-backout element that limits or precludes backing out of the electrical connector from the indicator module when the indicator module is electrically connected to the wire lead or harness of the mirror assembly or vehicle. The anti-backout element keeps the connector engaged if the assembly operator does not seat the connector completely in the pocket during assembly. The connector thus does not come loose due to vibration during operation of the vehicle.

These and other objects, advantages, purposes and features of the present invention will become apparent upon review of the following specification in conjunction with the drawings.

BRIEF DESCRIPTION OF THE DRAWINGS

FIG. 3 is a perspective view of the blind zone indicator module, shown with a removable release liner disposed at its adhesive attaching surface;

FIG. 4 is a bottom plan view of the blind zone indicator module of FIG. 3;

FIG. 5 is a top plan view of the blind zone indicator module of FIG. 3, shown with a potting material disposed at the circuit element;

FIG. 6 is a top plan view of the blind zone indicator module similar to FIG. 5, shown with the potting material removed from the circuit element;

FIG. 7 is a bottom plan view of the blind zone indicator module of FIGS. 3-5, shown without the removable release liner disposed at the attaching surface;

FIG. 8 is a perspective view of the blind zone indicator module of FIG. 6;

FIG. 9A is a rear elevation view of the blind zone indicator module;

FIG. 9B is a rear elevation view of the blind zone indicator module, shown with the removable release liner removed to expose the adhesive attaching surface;

FIG. 10 is a side view of the blind zone indicator module;

DESCRIPTION OF THE PREFERRED EMBODIMENTS

Figure 1:
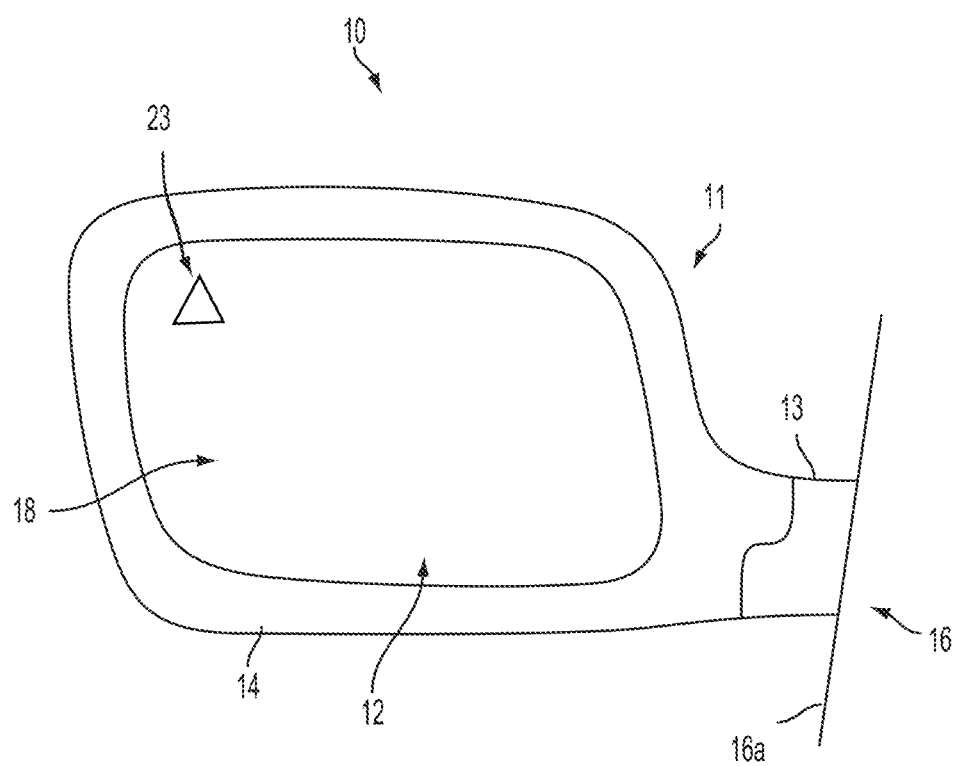
FIG. 1 is a view of an exterior mirror assembly with a blind zone indicator or indicator module in accordance with the present invention, shown as viewed in the direction of travel of the vehicle.
Figure 2:
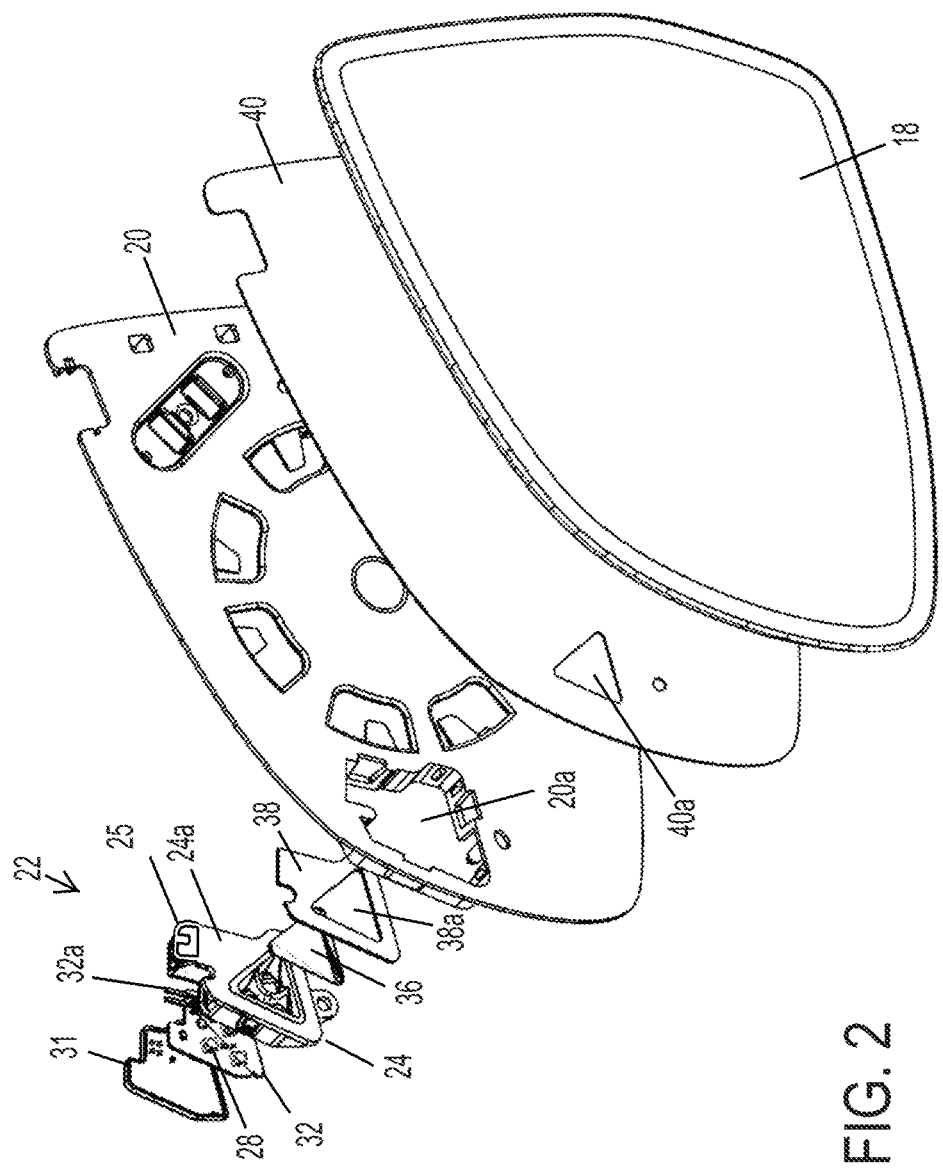
FIG. 2 is an exploded perspective view of the blind zone indicator module disposed at the back plate and heater pad and reflective element.

Referring now to the drawings and the illustrative embodiments depicted therein, an exterior rearview mirror assembly 10 for a vehicle includes a mirror head 11 comprising a mirror reflector sub-assembly 12 and a mirror shell or casing 14 (FIG. 1). The mirror assembly 10 is mounted at the side 16a of a host or subject vehicle 16 via a mounting structure 13 of the mirror assembly. The mirror reflector sub-assembly 12 includes a mirror reflective element 18 and a mirror reflector carrier or back plate 20 (as depicted in FIG. 2) attached to or mounted to or adhered to a rear surface of the mirror reflective element 18. Mirror assembly 10 includes an indicator or display element or device or signal indication module 22 (which may be a blind spot or blind zone indicator, lane change assist indicator, turn signal indicator, or the like) that is disposed at back plate 20 and behind reflective element 18, and that is operable to provide a display or visual indication 23 at the reflective element for viewing the display or visual indication through the mirror reflective element 18. For example, the mirror reflective element 18 may be configured to enable viewing of the display 23 via a window established through the mirror reflector coating of the reflective element 18, such as a window established via at least partial ablation of the mirror reflector coating of the reflective element, or the mirror reflective element 18 may be configured to enable viewing of the display 23 through a partially light transmissive and partially light reflective transflective mirror reflector of the reflective element.

The signal indication module 22 includes a housing 24 (that is received into or attached to an indicator receiving portion or mounting portion or structure of back plate 20 so as to be disposed generally at a rear surface of a planar portion of back plate 20) and an illumination source 28, such as one or more light emitting diodes (LEDs) or other suitable illumination source, disposed at a circuit element 32, which may be a circuit board or the like. The housing 24 of the signal indication module 22 includes an internal structure having an inner reflective surface that is formed to angle or reflect the light emitted by the light emitting diodes 28, such that light emitted by the light emitting diodes 28, when activated or energized or powered, is directed generally towards and is principally viewed by the driver of the vehicle. The signal indicator module 22 may utilize aspects of the modules or units described in U.S. Pat. No. 9,659,498 and/or U.S. Publication No. US-2016-0078768, which are hereby incorporated herein by reference in their entireties.

The housing 24 is open at the front and has a front or attaching surface 24a that is generally planar and that is configured to be received through the aperture 20a in the back plate 20. In the illustrated embodiment, a connector portion or receptacle 24b (which may comprise a recess in the housing or other suitable means for receiving a connector) of the housing 24 also provides a portion of the generally planar attaching surface. The back plate aperture is formed to receive the triangular shaped light reflecting portion of the housing and the connector portion of the housing therein. An adhesive tape or element or foam tape element 38, or other adhesive means, is shaped to correspond with the shape of the front surface 24a and has an aperture 38a formed therethrough that corresponds with the opening of the front portion 24a of the housing and that corresponds with a diffuser element 36. The adhesive tape 38 is configured to be adhered to the rear surface of a heater pad 40 (with the aperture 38a corresponding with an aperture 40a of the heater pad 40) and to be adhered to the front surface 24a of the housing 24 (including around the triangular-shaped aperture and at the connector portion) to attach the module 22 at the heater pad 40, which is adhered to the rear surface of the reflective element 18.

The circuit element 32, such as a printed circuit board or the like (such as a rigid or flexible circuit board or element), has the illumination source(s) or LED(s) 28 disposed thereat (such as surface mounted or otherwise disposed LEDs or other suitable or equivalent light source), although more illumination sources or LEDs may be provided while remaining within the spirit and scope of the present invention. The circuit element 32 or PCB includes circuitry including resistors and/or voltage reducing circuits and/or ballast circuitry and/or DC to DC converters and/or the like (such as by utilizing aspects of the circuits and light sources described in U.S. Pat. No. 7,195,381, which is hereby incorporated herein by reference in its entirety). The circuit element 32 is attachable at or positioned at a rear portion of the housing 24 (such as received at a pocket or receiving portion formed at the rear portion of the housing 24), whereby the illumination source 28 is located at the rear portion of the housing and at an opposite end of the housing from the reflective element 18. When the circuit element 32 is disposed in or received at the rear of the housing 24, a potting element or material 31 (as best seen in FIGS. 3 and 5) may be disposed over or applied or dispensed at the circuit element 32 to seal the circuit element 32 in the housing 24.

The circuit element 32 includes electrical terminals or connectors that are in electrical or conductive communication with illumination sources 28 (such as LEDs or other light sources) and that electrically connect the circuitry and light sources to electrical power or electrical control at the mirror assembly when the signal indication module 22 is attached to the back plate 20 and installed at the mirror casing 14. The terminals or connectors extend from the circuit element 32 and, when the circuit element 32 is received in the housing 24, are disposed at or in the sealed connector receptacle 24b of the housing 24. The terminals and connector receptacle 24b are configured to connect to a mating connector 33 for electrical connection to a wire harness connector of the mirror assembly 10 or vehicle 16 to provide power and/or control to the signal indication module 22 when the module is mounted to or attached to the back plate 20 and installed at the mirror casing 14.

Figure 12:
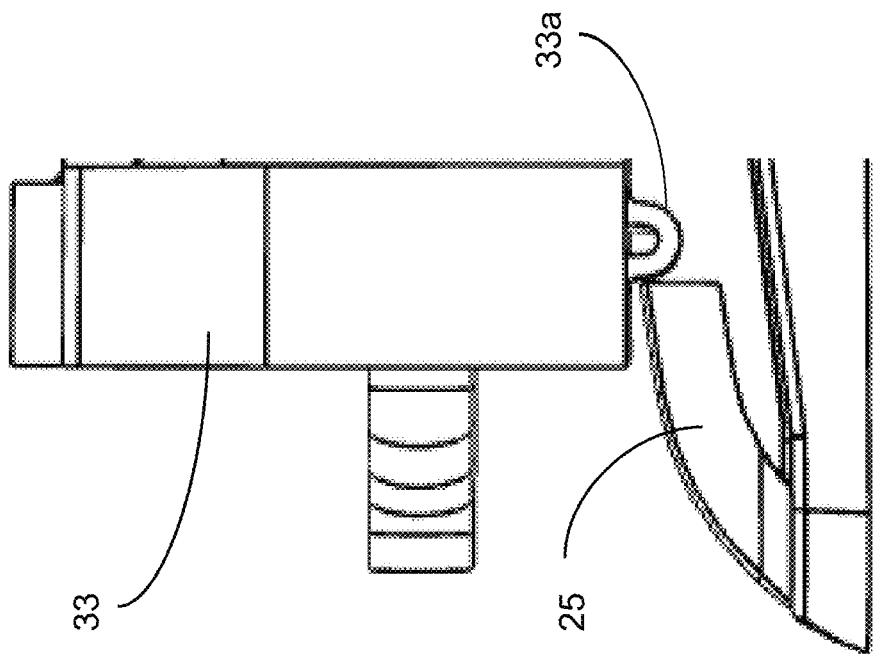
FIG. 12 is another enlarged side view of the wire harness connector and anti-backout element of the indicator module, with the wire harness connector partially retracted, but precluded from further retraction by the anti-backout element.
Figure 11:
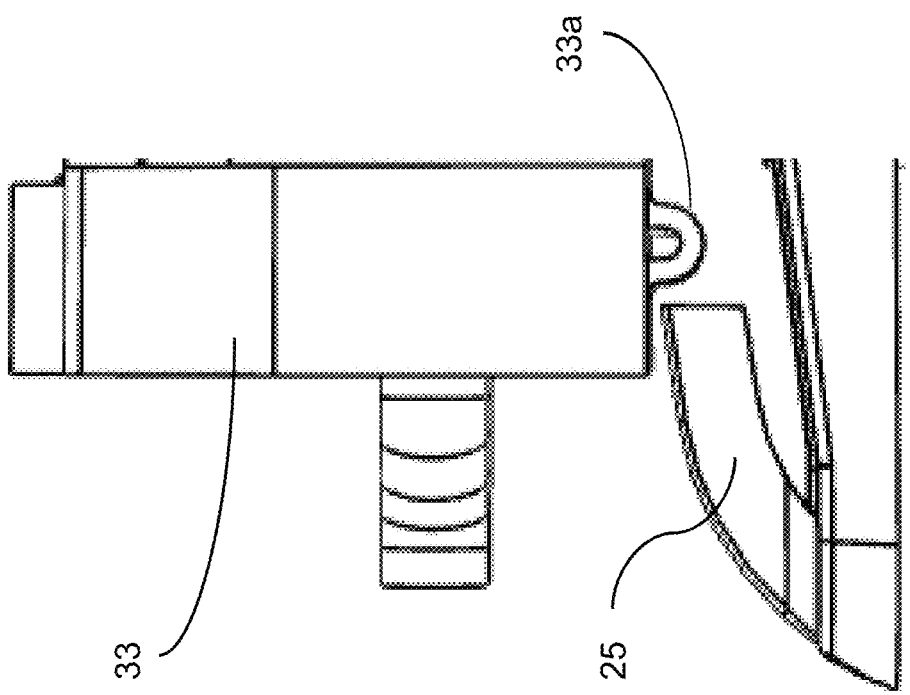
FIG. 11 is an enlarged side view of the wire harness connector and anti-backout element of the indicator module, with the wire harness connector inserted into the receptacle of the indicator.

As best shown in FIGS. 3-12, the indicator module includes an anti-backout element or tab 25 at the receiving end of the connector receptacle 24b. The anti-backout element 25 comprises a flexible element or tab that partially obstructs the entry or receiving end of the connector receptacle 24b. When the mating connector or connector end 33 (having wires and a connector extending therefrom for electrically connecting to a wire connector of a wire harness or the like) is inserted into the receptacle 24b (where the mating connector 33 may snap into the receptacle via suitable means when fully seated therein), the anti-backout element (due to its angled and flexible construction) flexes toward the front surface 24a of the housing 24 to allow for insertion of the mating connector 33. As shown in FIGS. 10-12, when the mating connector 33 is inserted into the connector receptacle 24b so that the outer or rear end of the mating connector 33 passes the inward end of the anti-backout element 25 or tab, the anti-backout element 25 returns to its original state and precludes backing out of the mating connector 33.

The mating connector 33, as best shown in FIGS. 10-12, may have a retaining tab 33a or portion configured to engage the anti-backout element 25. As shown in FIG. 12, if the mating connector 33 travels in the direction of the anti-backout element 25, at least a portion of the mating connector 33 (and optionally the retaining tab 33a) will contact the anti-backout element 25, precluding further travel and thereby retaining the mating connector 33 at the connector receptacle 24b. The anti-backout element thus provides further assurance that the mating connector cannot backout or loosen or detach from the indicator module due to vibration etc. when the mirror assembly and indicator module are installed on the vehicle and during normal operation of the vehicle, even in situations where the connector end is not fully seated or snapped into the receptacle by the operator assembling the mirror assembly.

With continued reference to FIGS. 3-12, the anti-backout element 25 is disposed at the connector portion of the housing 24 and is integrally molded with the housing material. In the illustrated embodiment, the anti-backout element 25 comprises a tab extending from a surface of the housing 24 opposite the front surface 24a so as to at least partially obstruct an opening of the connector receptacle 24b thereby blocking a travel path for installation of the mating connector 33 at the connector receptacle 24b. The anti-backout element 25 may extend from the housing 24 at a relatively wider footprint, tapering or narrowing from where the tab is integrally connected to the housing 24 towards a distal end of the tab. Tapering of the anti-backout element 25 may enable easier installation of a mating connector 33 at the connector receptacle 24b while maintaining rigid resistance to backing out or retraction of the mating connector 33 once received at the connector receptacle 24b.

During installation, the mating connector 33 may travel along a face of the anti-backout element 25 and apply a force biasing the tab toward the front surface 24a of the housing 24 so as to substantially form a travel path for the installation of the mating connector 33. The mating connector 33 and connector receptacle 24b may be configured in such a way that the mating connector 33 must engage the anti-backout 25 element during installation. Once the mating connector 33 is received at or fully seated or connected at the connector receptacle 24b, the anti-backout element 25 may be configured to return to a resting or supporting or resistant position wherein the mating connector 33 is precluded from moving along its travel path (and thus precluded from inadvertent disconnecting from the connector receptacle 24b) by the tab. Being integrally molded with the housing, the anti-backout element 25 may be of a thinner disposition of material relative to the body of the housing so as to remain flexible relative to the housing. Optionally, the anti-backout element 25 may comprise other features permitting flexibility such as an angled or tapered or bending construction. When it is desired to disconnect the mating connector from the indicator, a person can press the anti-backout element toward the front surface of the housing and retract the mating connector from the connector receptacle.

As shown in FIGS. 3-6 and 9A, the indicator module 22 may be provided with a removable release liner 35 at the adhesive layer at the front surface 24a of the housing 24. The module is provided with the liner 35 and with the mating connector 33 received in the receptacle 24b and retained therein via the anti-backout element 25. When so provided, an operator may remove the removable release liner 35 and insert the module 22 into the aperture 20a of the backing plate 20 and adhere the module 22 at the heater pad 40 at the rear of the reflective element 18 (via the adhesive tape 38 or layer). Even if the mating connector 33 is not fully snapped or seated in the receptacle, or if the snap attachment of the mating connector 33 loosens or releases during vibration of the module, backing out of the mating connector 33 is precluded due to the presence of the anti-backout element 25.

The adhesive tape 38 may comprise any suitable adhesive or foam tape that may conform to the front surface of the module housing 24a and to the heater pad 40 and/or rear surface of the reflective element 18 (such as to a curved rear surface for a non-planar reflective element or the like) while sealing and adhering the module housing 24 at the rear of the reflective element 18. For example, the foam tape may comprise a double coated polyethylene foam tape of the types commercially available from 3M of St. Paul, Minn., which provide a conformable closed cell foam with a rubber adhesive or a high strength acrylic adhesive, such as 3M's 4462 W, 4462B, 4466 W, 4466B, 4492G, 4492 W, 4492B, 4496 W or 4496B double coated polyethylene foam tapes or the like. The foam tape may comprise a dark colored tape (such as black) to limit or substantially preclude passage of light therethrough.

The adhesive tape 38 comprises a cut out or shaped tape element that adhesively attaches at the attaching or front surface 24a of the housing 24 and at the heater pad 40 or reflective element 18. The adhesive tape 38 may comprise a double sided tape element, such as a pressure sensitive adhesive (PSA) element, where a film is peeled off one or both sides of the adhesive tape 38 to expose the adhesive when attaching/adhering the tape element to the front surface 24a of the housing 24 and/or the rear surface of the heater pad 40 or mirror reflective element 18. The indicator module 22 may, when shipped, have the adhesive tape 38 attached at the attaching or front surface 24a of the housing 24, whereby, when assembling the mirror reflective element sub-assembly 12, an operator may peel the removable liner 35 or film off the front surface of the adhesive tape 38 at the front of the housing 24 to expose the adhesive and may insert the module 22 into the aperture 20a of the mirror back plate 20 and press the module 22 against the rear surface of the heater pad 40 or the rear surface of the mirror reflective element 18 to attach the module 22 at the rear of the reflective element 18. Optionally, the front surface of the adhesive tape 38 element may adhesively attach at the rear surface of the mirror back plate 20 (such as for applications where the aperture 20a through the back plate 20 generally corresponds with the triangular-shaped (or other shape) opening of the adhesive tape 38 element and/or front opening of the housing 24 and/or aperture 40a through the heater pad 40 and/or the like), whereby the attaching or front surface 24a of the housing 24 and the adhesive tape 38 element at least partially circumscribe the aperture 20a formed through the mirror back plate 20.

The diffuser element 36, as shown in FIG. 2, is shaped to attach at the front surface 24a of the housing 24 and/or at the rear surface of the reflective element 18 or at the rear surface of the heater pad 40, so as to be disposed at the aperture 38a of the adhesive tape 38, whereby light emitted by the LEDs 28 is directed through the diffuser element 36 and generally towards the driver of the vehicle. The diffuser element 36 may comprise any suitable diffuser element. For example, the diffuser element may comprise a diffuser film or element of the types commercially available from Keiwa Inc. of Tokyo Japan, such as, for example, Keiwa's PBS-series of diffuser films or the like. The diffuser element 36 thus is at least partially transmissive of visible light and also functions as a cover element at the front surface 24a of the housing 24 to close the opening of the housing 24 circumscribed by the attaching front surface 24a.

The cut out triangle-shaped aperture 38a in the adhesive tape 38 is about 1.5 times larger than an ablated triangle formed through the mirror reflector of the reflective element. This allows the ablated triangle at the glass and the back plate to be slightly mis-located and not have winking (black tape visible from the glass side). The tape diffuser works best when it is disposed subflush to the molded housing or diffuser (i.e., is received in a recess at the front portion of the housing). Such an arrangement provides the least amount of light leakage at the diffuser element.

The signal indication module 22 includes the diffuser element 36 that is disposed at or near a forward end region or portion corresponding to the front surface 24a of the housing 24 so as to be disposed at the rear of the reflective element 18 when the signal indication module 22 is attached at the back plate 20 and heater pad 40 and rear surface of the reflective element 18. Optionally, the walls or surfaces of the inner surface or internal structure of the housing 24 may comprise highly specularly and/or diffusely light reflecting inner surfaces so as to enhance diffuse reflection of incident light to enhance the intensity of illumination that exits the indicator module 22 through the indicia element. For example, the housing wall may be molded of a white plastic material or resin, such as an ABS or an ABS/polycarbonate polymeric resin material or the like. The housing 24 may comprise a polymeric housing molded via a unitary injection molding process.

Optionally, the heater pad 40 may be provided at the rear surface of the glass substrate of the reflective element 18 and between the backing portion of the back plate 20 and the reflective element 18 to provide an anti-fogging of defogging feature to the exterior mirror assembly 10 (such as by utilizing aspects of the heater elements or pads described in U.S. Pat. No. 7,400,435, which is hereby incorporated herein by reference in its entirety). The back plate 20 and/or heater pad 40 may include suitable electrical connectors and connections incorporated therein for electrically connecting the heater pad 40 and/or indicator module 22 and/or display element (or other suitable electrical connectors may be utilized, such as electrical leads or wire harnesses or pigtails or other separate connectors or cables or the like). The heater pad 40 may include an aperture 40a or a hole or opening therethrough (or optionally a window or transparent or translucent or diffuse portion of the heater pad 40, such as a clear or diffusing transparent polyester flexible plastic film or element) that generally corresponds to the aperture 20a of the back plate 20 when the heater pad 40 is attached to the rear surface of the glass substrate of the reflective element 18 (such as via an adhesive such as a pressure sensitive adhesive) and when the back plate 20 is attached to the rear surface of the heater pad 40. Optionally, and desirably, the heater pad 40 may include an adhesive layer (such as a pressure sensitive adhesive layer) at its rear surface for adhering the back plate 20 to the heater pad 40 and thus to the rear surface of the glass substrate of the reflective element 18.

For applications where the indicator module 22 attaches at the rear of the heater pad 40 (such that the portion of the heater pad that circumscribes the aperture 40a through the heater pad 40 is contacted by the adhesive tape 38), the aperture 40a through the heater pad 40 may generally correspond with the opening of the housing 24 that is circumscribed by the attaching front surface 24a of the housing 24. For example, and such as shown in FIG. 2, the aperture 40a through the heater pad 40 is smaller than the foot print of the front surface 24a of the housing 24 (and the aperture 40a generally corresponds with the aperture 38a of the foam tape element 38), such that the front surface 24a attaches to one side of the adhesive tape 38 and the other side of the adhesive tape 38 attaches to the rear of the heater pad 40. Optionally, for applications where the indicator module 22 attaches at the rear surface of the mirror reflective element 18, the aperture 40a or hole through the heater pad 40 is at least as large or larger than the foot print of the front surface 24a of the housing 24 (which is about the same as or slightly smaller than the aperture 20a through the mirror back plate 20) to provide clearance for the front surface 24a of the housing 24 to pass through the back plate aperture 20a and through the aperture 40a of the heater pad 40 to attach at the rear surface of the mirror reflective element 18 via the adhesive tape 38.

The back plate 20 and/or signal indication module 22 may be formed to provide a desired shape for viewing of the light passing through the reflective element or the mirror reflective element 18 preferably includes one or more iconistic display areas or masks so that the illumination is viewable and discernible as a display 23 at the reflective element 18 by the desired or targeted viewer. The mirror assembly 10 thus may provide an iconistic display for an object detection/LCA system and/or an iconistic display for a turn signal indication, and/or may provide other displays or illumination devices, without affecting the scope of the present invention.

The back plate 20 may comprise any suitable back plate structure, and may be molded or formed, such as by injection molding, so as to provide the indicator receiving portion and a generally planar backing portion that attaches to the rear surface of the reflective element 18 (such as via adhesive or other suitable attachment means). As shown in FIG. 2, the back plate 20 includes an aperture 20a or hole at the mounting portion such that when the signal indication module 22 is attached to the mounting portion of the back plate 20, the front end of the housing 24 and the diffuser element 36 of the signal indication module 22 are positioned at and through the aperture 20a and at or against the rear surface of the reflective element substrate. Preferably, the back plate 20 is molded of a substantially dark or opaque or black material, such as from an ABS or PC-ABS or polycarbonate polymeric resin material or from any other suitable material such as known in the exterior rearview mirror art, so as to be substantially opaque such that light does not pass through the opaque back plate and the indicator mounting portion.

Optionally, and desirably, the indicator mounting portion or structure may be unitarily or integrally formed with the back plate 20 and may be formed with a pocket for receiving or partially receiving the housing 24 to locate the signal indication module 22 at the generally planar backing portion of the back plate 20. For example, the pocket may receive the housing 24 at least partially therein, and the indicator mounting portion may secure (such as by snapping or the like) the housing at or in the pocket of the indicator mounting portion of the back plate 20 (such as via tabs on the back plate 20 engaging flanges or surfaces of the module housing 24 to snap the signal indication module 22 to the back plate 20 with the forward end of the housing 24 and the indicia element urged toward and against the rear surface of the reflective element 18). The back plate 20 and its indicator mounting portion and aperture may be formed in the plastic injection molding process.

In the illustrated embodiment of FIGS. 3-12, the signal indication module 22 comprises a blind zone indicator for an object detection in a blind spot detection system or LCA system (with the indicator module being angled and operated to provide a signal that is principally viewable by the driver of the vehicle). Optionally, the indicator module may also or otherwise include a display device or indicator for a turn signal indicator (such as in FIGS. 13-15) or signal indication module or other indicator device. The blind zone or signal indicator assembly or indicator module of the present invention may utilize aspects of the indicators described in U.S. Pat. Nos. 8,786,704; 8,058,977; 7,944,371; 7,581,859; 7,038,577; 6,882,287; 6,198,409; 5,929,786 and/or 5,786,772, and/or International Publication Nos. WO 2007/005942 and/or WO 2006/124682, which are all hereby incorporated herein by reference in their entireties.

Figure 13:
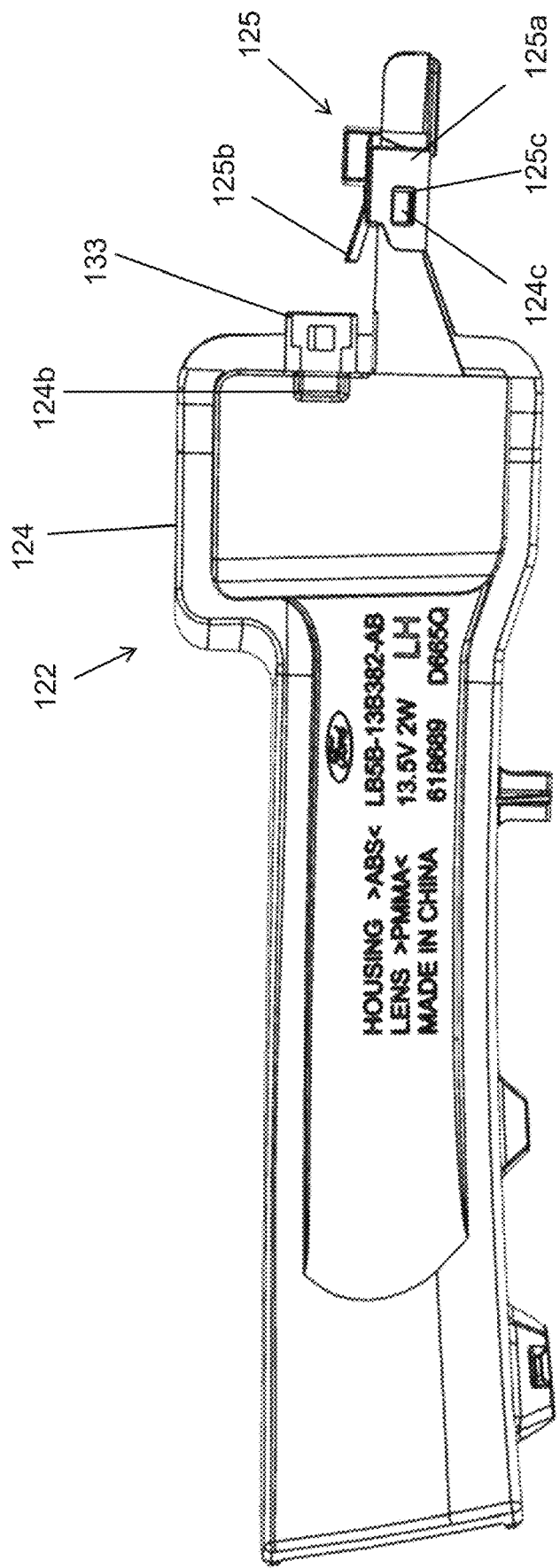
FIG. 13 is a bottom plan view of a turn signal indicator module in accordance with the present invention.
Figure 14:
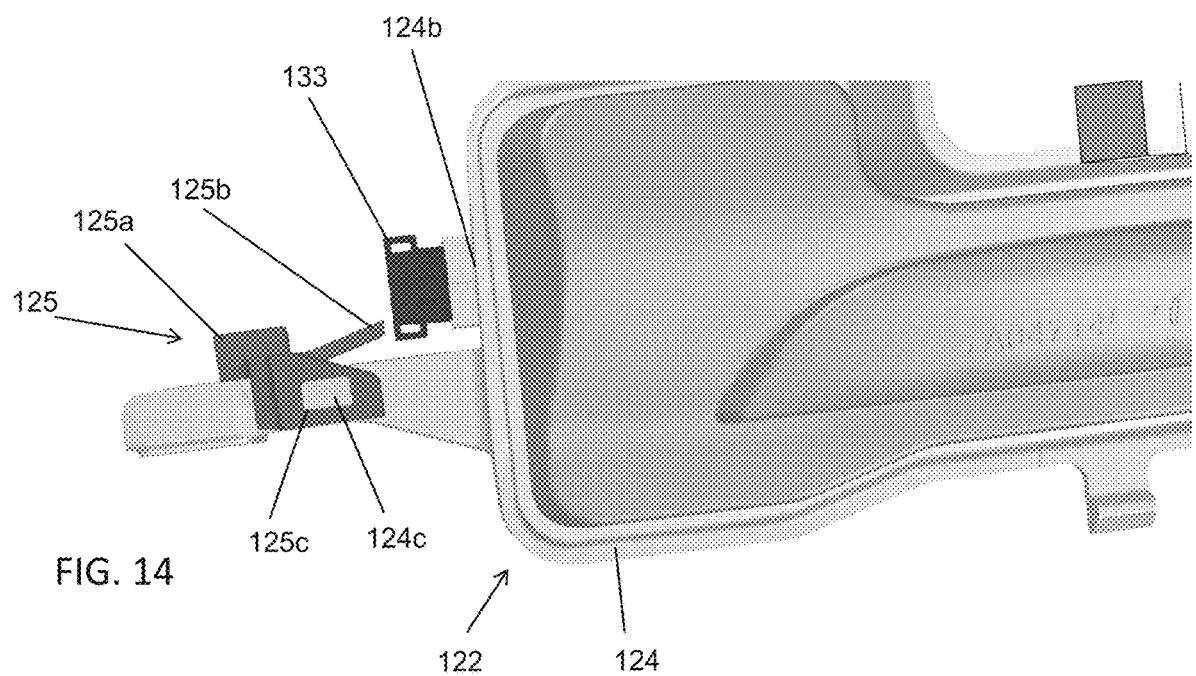
FIGS. 14 and 15 are perspective views of the turn signal indicator module of FIG. 13.
Figure 15:
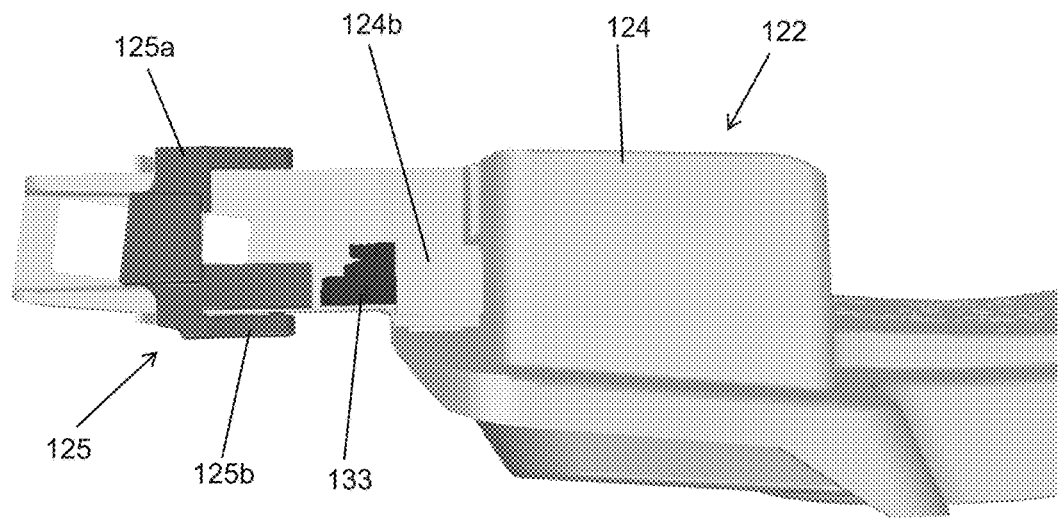

Referring to FIGS. 13-15, a turn signal indicator 122 is provided having a housing 124 with a connector receptacle 124b configured to receive a mating connector 133, and an anti-backout element 125 disposed at the housing 124 at or near the connector receptacle 124b. The anti-backout element 125 comprises a separate element snap-attached to the housing 124, but may otherwise be similar to the anti-backout element 25, discussed above. The anti-backout element 125 may have a body portion 125a configured to releasably engage and receive the housing 124 such as by wrapping around and contacting the housing 124 on multiple or several or opposite planar or irregular surfaces (such that movement of the anti-backout element 125 in any number of directions would cause a portion of the body portion 125a to contact a surface of the housing 124 thereby resisting further movement) and/or by receiving a raised portion 124c of the housing through or into a corresponding aperture 125c of the body portion 125a. The anti-backout element 125 includes a tab portion 125b that extends toward the connector receptacle 124b from, and may be integrally molded to, the body portion 125a of the anti-backout element 125. The tab portion 125b, together with the body portion 125a (as a complete, integrally formed anti-backout element 125), snap-attaches to the housing 124 so as to retain a mating connector 133 at the connector receptacle 124b and/or preclude the disconnection of a mating connector 133, such as in a similar manner as described above.

The anti-backout element 125 of the illustrated embodiment may be snap-attached to the housing 124 before or after the mating connector 133 is received at the connector receptacle 124b. If the anti-backout element 125 is snap-attached to the housing 124 before the mating connector 133 is received, the anti-backout element 125 will function in a substantially similar manner to embodiments described above to permit travel of the mating connector 133 into the connector receptacle 124b. Likewise, the tab portion 125b may return to a resting or supporting or resistant position whereby the mating connector 133 is precluded from disconnecting from the connector receptacle 124b. If the mating connector 133 is at the connector receptacle 124b when the anti-backout element 125 is snap-attached to the housing, the tab portion 125b will be in a resting or supporting or resistant position relative to the mating connector 133 after being snap-attached to the housing. Thus, if characteristics of the indicator module or housing prevent or otherwise inhibit the anti-backout element from being integrally formed with the housing, an indicator module may nevertheless include an anti-backout element as a removably snap-attachable component.

Optionally, the indicator module may comprise a logo lamp or projection/display element for a ground illumination or icon display system or device operable to project an icon or logo or light onto or otherwise illuminate a side of the vehicle or a ground surface adjacent to the side of the vehicle at which the mirror assembly is mounted. Optionally, such a logo lamp or indicator may emit light to backlight or illuminate a logo or icon established at the mirror reflector of the reflective element (such as via laser etching or masking of the mirror reflector coating at the glass substrate of the mirror reflective element to form a window through the mirror reflector coating), such that the icon or logo or the like is viewable by the driver of the vehicle or by other people exterior of the vehicle when the light source is activated or electrically powered. Optionally, the mirror reflector may comprise a partially light transmitting and partially light reflecting transflective mirror reflector, such that the icon or logo or the like is viewable through the transflective mirror reflector when the light source is powered, but is rendered covert behind the transflective mirror reflector when the light source is not powered. The mirror assembly and logo or icon indicator or illuminator module may utilize aspects of the icon display modules, illumination modules, and/or ground illumination systems described in U.S. Pat. Nos. 9,616,808; 10,589,716 and/or 10,744,930, which are all hereby incorporated herein by reference in their entireties.

The back plate may include an attachment element or elements (such as an annular ring or tab or annular prongs or annular snaps or the like) formed or established at the rear of the backing portion for attaching the back plate 20 and reflective element 18 to a mirror actuator (such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and/or 5,900,999, which are hereby incorporated herein by reference herein in their entireties), which is adjustable or operable to adjust a viewing angle of the mirror reflective element.

Optionally, and preferably, the indicator module may snap into the end or pocket of the indicator mounting portion or may otherwise be attached or stuck at the indicator mounting portion, and may have a gasket or seal at the signal indication module to provide a substantially water proof or water resistant or water tight seal at the signal indication module, whereby the signal indication module may be sealed at the indicator mounting portion, such as by gluing or pressing or screwing or gasketing or hermetically sealing or otherwise substantially sealing the signal indication module at the indicator mounting portion. The signal indication module may comprise a self-contained, unitary, sealed or substantially sealed, indicator module that includes the housing and cover element, an illumination source (such as one or more LEDs or the like), a DC converter with a voltage dropping resistor (such as described in U.S. Pat. Nos. 7,195,381; 6,902,284 and/or 6,690,268, which are hereby incorporated herein by reference in their entireties) and the electrical terminals or connector. The unitary signal indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

The blind zone indicators of the present invention thus are operable to provide an indication to the driver of the host vehicle that an object or other vehicle has been detected in the lane or area adjacent to the side of the host vehicle. The blind zone indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786 and/or 5,786,772, and/or of the reverse or backup aid systems, such as the rearward directed vehicle vision systems described in U.S. Pat. Nos. 5,550,677; 5,760,962; 5,670,935; 5,877,897; 6,201,642; 6,396,397; 6,498,620; 6,717,610; 6,757,109 and/or 7,005,974, and/or of the automatic headlamp controls described in U.S. Pat. Nos. 7,526,103; 5,796,094 and/or 5,715,093, and/or of the rain sensors described in U.S. Pat. Nos. 6,250,148 and/or 6,341,523, and/or of other imaging systems, such as the types described in U.S. Pat. Nos. 6,353,392 and/or 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962 and/or 5,796,094, and/or International Publication No. WO 2004/047421, with all of the above referenced U.S. patents and PCT applications being commonly assigned and being hereby incorporated herein by reference in their entireties.

The indicator icon or display, when the light source of the indicator module is activated, may be viewable through a transflective mirror reflector of the mirror reflective element or may be viewable through a window that is formed (such as via ablation) at least partially through the mirror reflector of the mirror reflective element. The reflective element may comprise a single substrate with a reflective coating at its rear surface, without affecting the scope of the present invention. The mirror assembly thus may comprise a planar or non-planar mirror element having a single substrate reflective element, such as a mirror assembly utilizing aspects described in U.S. Pat. Nos. 7,249,860; 6,318,870; 6,598,980; 5,327,288; 4,948,242; 4,826,289; 4,436,371 and/or 4,435,042, and/or International Publication No. WO 2004/103772, which are hereby incorporated herein by reference in their entireties. Optionally, aspects of the indicator may be suitable for use with an electro-optic or electrochromic reflective element or cell, such as an electrochromic mirror assembly and electrochromic reflective element utilizing principles disclosed in commonly assigned U.S. Pat. Nos. 7,626,749; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,712,879; 7,195,381 and/or 7,255,451, and/or International Publication No. WO 2006/124682, which are all hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
   a mounting structure configured for mounting the vehicular exterior rearview mirror assembly at a side of a vehicle;
   a mirror head disposed at the mounting structure, the mirror head comprising a mirror casing and a mirror reflective element;
   an indicator module disposed at a rear portion of the mirror reflective element;
   wherein the indicator module comprises a housing, and wherein the housing comprises an indicating portion and a connector portion;
   wherein the indicator module comprises a circuit board disposed in the indicating portion of the housing and having circuitry and a light source disposed thereat, wherein the light source comprises at least one light emitting diode;
   wherein the circuitry includes electrically conductive terminals that extend from the circuit board and that are disposed at the connector portion;
   wherein the connector portion of the housing has an anti-backout element disposed thereat, and wherein the anti-backout element comprises a flexible tab disposed at an entry passageway of an electrical connector;
   wherein the connector portion is configured to receive a connecting end of the electrical connector for electrically connecting the electrically conductive terminals to a wire harness when the vehicular exterior rearview mirror assembly is mounted at a vehicle;
   wherein the flexible tab of the anti-backout element flexes away from the entry passageway of the electrical connector as the electrical connector is inserted in the connector portion and flexes back to an initial position upon insertion of the electrical connector into the connector portion whereby the anti-backout element engages the electrical connector and precludes backing out of the electrical connector from the connector portion; and
   wherein, with the mounting structure mounted at the side of the vehicle and with the electrically conductive terminals electrically connected to the wire harness, light emitted by the at least one light emitting diode, when electrically powered, is visible through the mirror reflective element by a driver of the vehicle.

2. The vehicular exterior rearview mirror assembly of claim 1, wherein the housing comprises a plastic housing formed in a plastic injection molding operation.

3. The vehicular exterior rearview mirror assembly of claim 2, wherein the anti-backout element is integrally formed with the connector portion during the plastic injection molding operation.

4. The vehicular exterior rearview mirror assembly of claim 1, wherein the anti-backout element is detachably attached at the housing.

5. The vehicular exterior rearview mirror assembly of claim 4, wherein the anti-backout element is snap-attached at the housing.

6. The vehicular exterior rearview mirror assembly of claim 1, wherein the indicator module comprises a blind zone indication module.

7. The vehicular exterior rearview mirror assembly of claim 1, wherein the housing comprises an attaching surface configured to attach the housing at a mirror reflective element of the vehicular exterior rearview mirror assembly.

8. The vehicular exterior rearview mirror assembly of claim 7, wherein a surface of the connector portion of the housing forms part of the attaching surface.

9. The vehicular exterior rearview mirror assembly of claim 8, wherein an aperture formed through a mirror back plate is configured to receive the housing with the connector portion when the housing is attached at the mirror reflective element.

10. The vehicular exterior rearview mirror assembly of claim 7, wherein the circuit board is parallel to the attaching surface of the housing.

11. The vehicular exterior rearview mirror assembly of claim 7, wherein a pressure sensitive adhesive tape is disposed at the attaching surface of the housing to attach the attaching surface at the mirror reflective element.

12. The vehicular exterior rearview mirror assembly of claim 11, wherein the pressure sensitive adhesive tape is configured to adhesively attach at the attaching surface of the housing, and wherein the pressure sensitive adhesive tape comprises an aperture therethrough that generally corresponds to the shape of an opening at the attaching surface of the housing.

13. The vehicular exterior rearview mirror assembly of claim 12, wherein the aperture of the pressure sensitive adhesive tape comprises a triangular-shaped aperture.

14. The vehicular exterior rearview mirror assembly of claim 1, wherein the light source comprises a plurality of light emitting diodes.

15. A vehicular exterior rearview mirror assembly, the vehicular exterior rearview mirror assembly comprising:
a mounting structure configured for mounting the vehicular exterior rearview mirror assembly at a side of a vehicle;
a mirror head disposed at the mounting structure, the mirror head comprising a mirror casing and a mirror reflective element, the mirror reflective element attached at a mirror back plate;
a blind zone indication module disposed at a rear portion of the mirror reflective element;
wherein the blind zone indication module is received at an aperture formed through the mirror back plate;
wherein the blind zone indication module comprises a plastic housing formed in a plastic injection molding operation, and wherein the housing comprises an indicating portion and a connector portion;
wherein the blind zone indication module comprises a circuit board disposed in the indicating portion of the housing and having circuitry and a light source disposed thereat, wherein the light source comprises at least one light emitting diode;
wherein the circuitry includes electrically conductive terminals that extend from the circuit board and that are disposed at the connector portion;
wherein the connector portion of the housing has an anti-backout element disposed thereat and integrally formed with the connector portion during the plastic injection molding operation, and wherein the anti-backout element comprises a flexible tab disposed at an entry passageway of an electrical connector;
wherein the connector portion is configured to receive a connecting end of the electrical connector for electrically connecting the electrically conductive terminals to a wire harness when the vehicular exterior rearview mirror assembly is mounted at a vehicle;
wherein the flexible tab of the anti-backout element flexes away from the entry passageway of the electrical connector as the electrical connector is inserted in the connector portion and flexes back to an initial position upon insertion of the electrical connector into the connector portion whereby the anti-backout element engages the electrical connector and precludes backing out of the electrical connector from the connector portion; and
wherein, with the mounting structure mounted at the side of the vehicle and with the electrically conductive terminals electrically connected to the wire harness, light emitted by the at least one light emitting diode, when electrically powered responsive to a blind zone monitoring system of the vehicle, is visible through the mirror reflective element by a driver of the vehicle.

16. The vehicular exterior rearview mirror assembly of claim 15, wherein the anti-backout element is integrally formed with the connector portion during the plastic injection molding operation.

17. The vehicular exterior rearview mirror assembly of claim 15, wherein the anti-backout element is detachably attached at the housing.

18. The vehicular exterior rearview mirror assembly of claim 17, wherein the anti-backout element is snap-attached at the housing.

19. The vehicular exterior rearview mirror assembly of claim 15, wherein the housing comprises an attaching surface configured to attach the housing at a mirror reflective element of the vehicular exterior rearview mirror assembly.

20. The vehicular exterior rearview mirror assembly of claim 19, wherein a surface of the connector portion of the housing forms part of the attaching surface.

21. The vehicular exterior rearview mirror assembly of claim 19, wherein a pressure sensitive adhesive tape is disposed at the attaching surface of the housing to attach the attaching surface at the mirror reflective element.

22. The vehicular exterior rearview mirror assembly of claim 21, wherein the pressure sensitive adhesive tape is configured to adhesively attach at the attaching surface of the housing, and wherein the pressure sensitive adhesive tape comprises an aperture therethrough that generally corresponds to the shape of an opening at the attaching surface of the housing.

23. The vehicular exterior rearview mirror assembly of claim 15, wherein the light source comprises a plurality of light emitting diodes.

24. A vehicular exterior rearview mirror assembly, the vehicular exterior rearview mirror assembly comprising:
a mounting structure configured for mounting the vehicular exterior rearview mirror assembly at a side of a vehicle;
a mirror head disposed at the mounting structure, the mirror head comprising a mirror casing and a mirror reflective element;
an icon illuminating module disposed at an interior portion of the mirror casing;
wherein the icon illuminating module comprises a plastic housing formed in a plastic injection molding operation, and, and wherein the housing comprises an indicating portion and a connector portion;

wherein the icon illuminating module comprises a circuit board disposed in the indicating portion of the housing and having circuitry and a light source disposed thereat, wherein the light source comprises at least one light emitting diode;

wherein the circuitry includes electrically conductive terminals that extend from the circuit board and that are disposed at the connector portion;

wherein the connector portion of the housing has an anti-backout element disposed thereat, and wherein the anti-backout element comprises a flexible tab disposed at an entry passageway of an electrical connector;

wherein the connector portion is configured to receive a connecting end of the electrical connector for electrically connecting the electrically conductive terminals to a wire harness when the vehicular exterior rearview mirror assembly is mounted at a vehicle;

wherein the flexible tab of the anti-backout element flexes away from the entry passageway of the electrical connector as the electrical connector is inserted in the connector portion and flexes back to an initial position upon insertion of the electrical connector into the connector portion whereby the anti-backout element engages the electrical connector and precludes backing out of the electrical connector from the connector portion; and wherein, with the mounting structure mounted at the side of the vehicle and with the electrically conductive terminals electrically connected to the wire harness, light emitted by the at least one light emitting diode, when electrically powered, illuminates an icon that is viewable by a person exterior of the vehicle.

25. The vehicular exterior rearview mirror assembly of claim 24, wherein the anti-backout element is integrally formed with the connector portion during the plastic injection molding operation.

26. The vehicular exterior rearview mirror assembly of claim 24, wherein the anti-backout element is detachably attached at the housing.

27. The vehicular exterior rearview mirror assembly of claim 26, wherein the anti-backout element is snap-attached at the housing.

28. The vehicular exterior rearview mirror assembly of claim 24, wherein the light emitted by the at least one light emitting diode, when electrically powered, projects the icon onto a surface.

29. The vehicular exterior rearview mirror assembly of claim 28, wherein the surface comprises a ground surface along the side of the vehicle at which the vehicular exterior rearview mirror assembly is mounted.

30. The vehicular exterior rearview mirror assembly of claim 24, wherein the icon, when illuminated by the light emitted by the at least one light emitting diode, when electrically powered, is viewable through the mirror reflective element.

31. The vehicular exterior rearview mirror assembly of claim 30, wherein the icon illuminating module is disposed at a rear portion of the mirror reflective element and is received at an aperture formed through a mirror back plate attached at the mirror reflective element.

* * * * *